US012093087B2

(12) United States Patent
Liu

(10) Patent No.: US 12,093,087 B2
(45) Date of Patent: Sep. 17, 2024

(54) HINGE APPLIED TO INWARD-FOLDABLE FLEXIBLE SCREEN TERMINAL AND INWARD-FOLDABLE FLEXIBLE SCREEN TERMINAL

(71) Applicant: Hangzhou Amphenol Phoenix Telecom Parts Co., Ltd., Hangzhou (CN)

(72) Inventor: Xiaojie Liu, Hangzhou (CN)

(73) Assignee: HANGZHOU AMPHENOL PHOENIX TELECOM PARTS CO., LTD., Zhejiang (CN)

( * ) Notice: Subject to any disclaimer, the term of this patent is extended or adjusted under 35 U.S.C. 154(b) by 208 days.

(21) Appl. No.: 17/768,036

(22) PCT Filed: Sep. 29, 2020

(86) PCT No.: PCT/CN2020/118705
§ 371 (c)(1),
(2) Date: Apr. 11, 2022

(87) PCT Pub. No.: WO2021/068794
PCT Pub. Date: Apr. 15, 2021

(65) Prior Publication Data
US 2023/0053947 A1 Feb. 23, 2023

(30) Foreign Application Priority Data
Oct. 12, 2019 (CN) .......................... 201921701068.7

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC .... G06F 1/1681; G06F 1/1652; G06F 1/1641; H04M 1/0268; H04M 1/022
See application file for complete search history.

(56) References Cited

U.S. PATENT DOCUMENTS

| 9,600,035 B2 * | 3/2017 | Park .................. G06F 1/1681 |
| 9,874,906 B1 * | 1/2018 | Hsu ................... G06F 1/1681 |

(Continued)

FOREIGN PATENT DOCUMENTS

| CN | 207782858 U | 8/2018 |
| CN | 207977992 U | 10/2018 |

(Continued)

*Primary Examiner* — Imani N Hayman
*Assistant Examiner* — Theron S Milliser
(74) *Attorney, Agent, or Firm* — MUNCY, GEISSLER, OLDS & LOWE, P.C.

(57) ABSTRACT

The present invention provides a hinge applied to an inward-foldable flexible screen terminal and an inward-foldable flexible screen terminal. The hinge comprises a middle support, a left rotary connecting part, and a right rotary connecting part. The present invention allows a left housing and a right housing to rotate respectively around the rotation axes of the left rotary connecting part and the right rotary connecting part as axes, and synchronously rotate in opposite directions. The present invention can reduce the space occupied by synchronous opposite connecting mechanisms, making the volume of the hinge smaller, and reducing the size of a middle decorative casing.

9 Claims, 4 Drawing Sheets

(56) References Cited

U.S. PATENT DOCUMENTS

| | | | | |
|---|---|---|---|---|
| 10,133,303 B2* | 11/2018 | Park | ...................... | G06F 1/1616 |
| 10,429,896 B2* | 10/2019 | Kuramochi | ............ | G06F 1/1681 |
| 10,520,989 B1* | 12/2019 | Hsu | ...................... | G06F 1/1616 |
| 11,223,710 B2* | 1/2022 | Cheng | ................. | H04M 1/0268 |
| 11,467,633 B2* | 10/2022 | Liao | .................... | H04M 1/0268 |
| 11,832,405 B2* | 11/2023 | Zhang | ................. | H05K 5/0226 |
| 2012/0182677 A1 | 7/2012 | Seo | | |
| 2015/0233162 A1 | 8/2015 | Lee et al. | | |
| 2016/0085265 A1* | 3/2016 | Park | .................... | H04M 1/0268 |
| | | | | 361/807 |
| 2017/0123455 A1* | 5/2017 | Park | .................... | H04M 1/0268 |
| 2019/0086965 A1* | 3/2019 | Kuramochi | ............ | G06F 1/1652 |
| 2019/0391618 A1* | 12/2019 | Hsu | ...................... | G06F 1/1616 |
| 2021/0067614 A1* | 3/2021 | Cheng | ................... | G06F 1/1681 |
| 2021/0181808 A1* | 6/2021 | Liao | ..................... | G06F 1/1641 |
| 2021/0355988 A1* | 11/2021 | Cheng | ................... | G06F 1/1681 |
| 2022/0217228 A1* | 7/2022 | Hu | ........................ | G06F 1/1681 |
| 2022/0377919 A1* | 11/2022 | Zhang | ................. | H05K 5/0226 |
| 2023/0054923 A1* | 2/2023 | Liao | ...................... | G06F 1/1641 |
| 2023/0221773 A1* | 7/2023 | Zhang | ................... | F16C 11/12 |
| | | | | 361/679.27 |

FOREIGN PATENT DOCUMENTS

| | | |
|---|---|---|
| CN | 211239890 U | 8/2020 |
| CN | 211239891 U | 8/2020 |
| CN | 211429359 U | 9/2020 |

\* cited by examiner

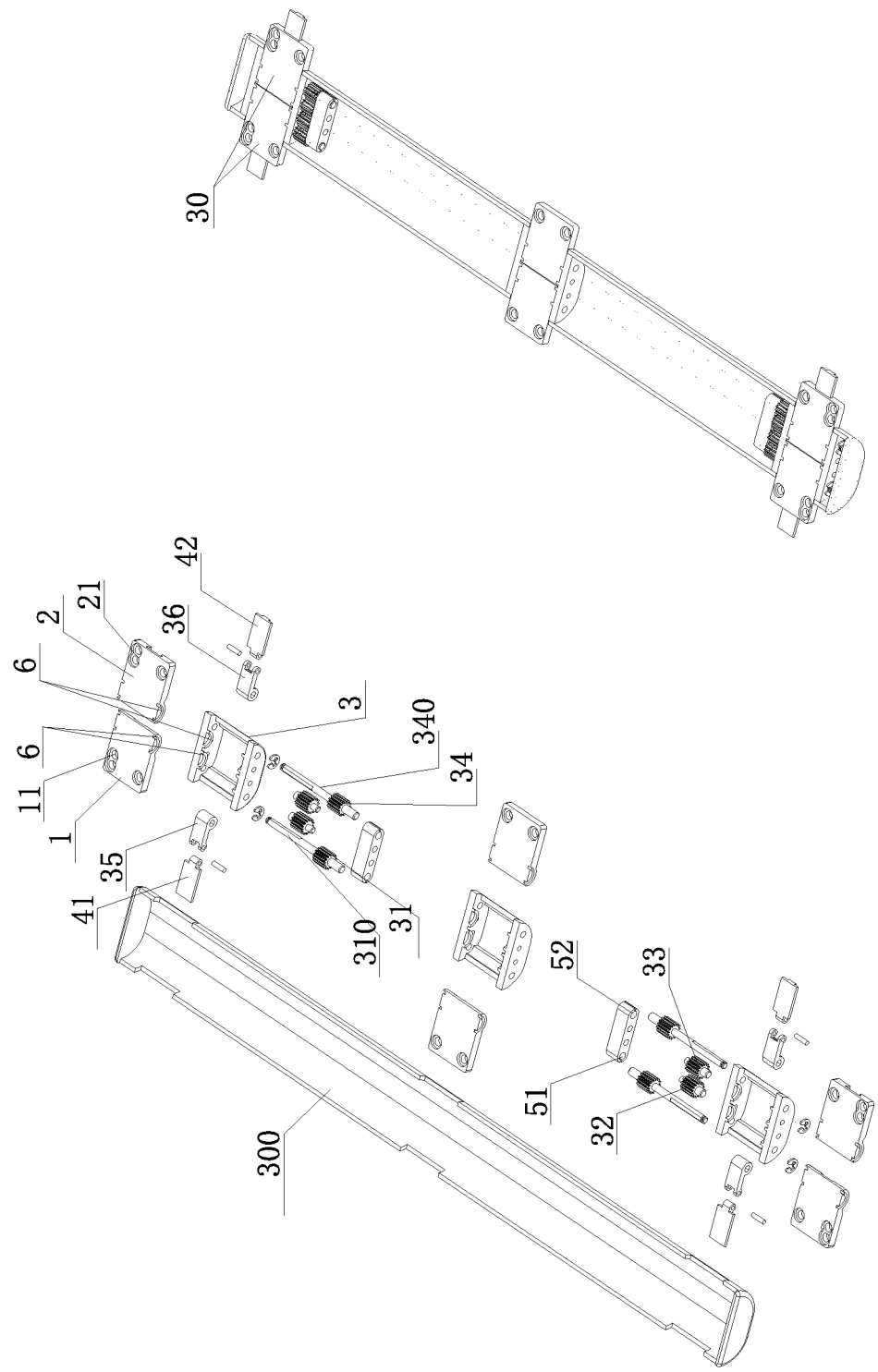

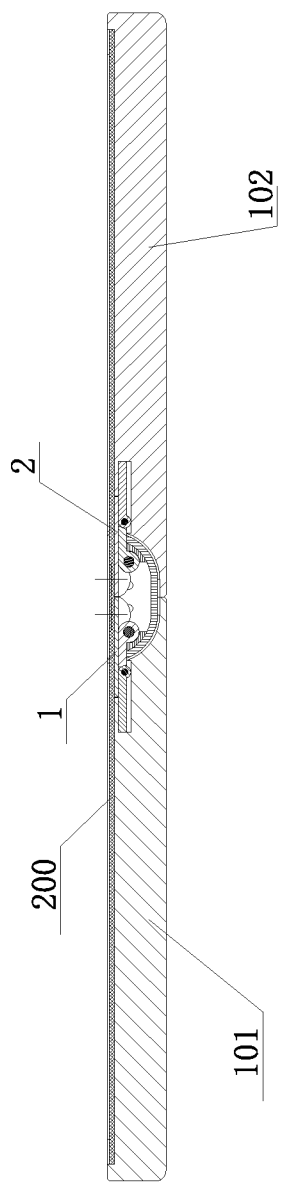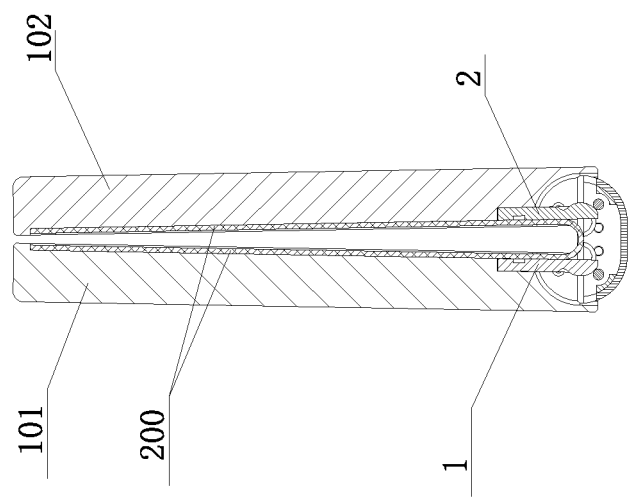

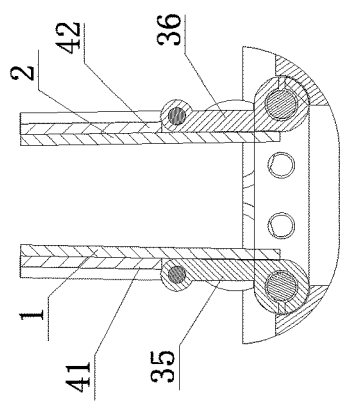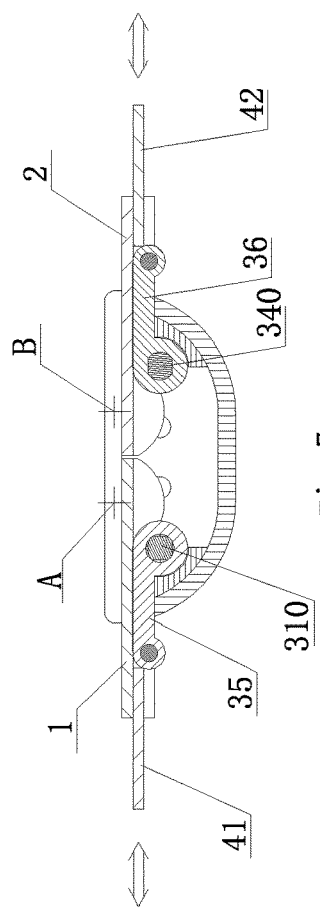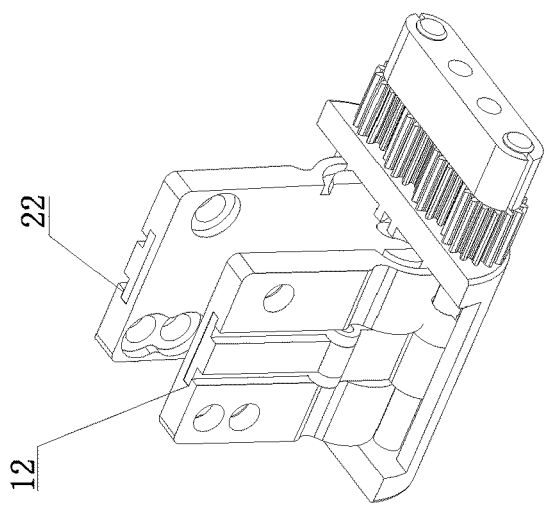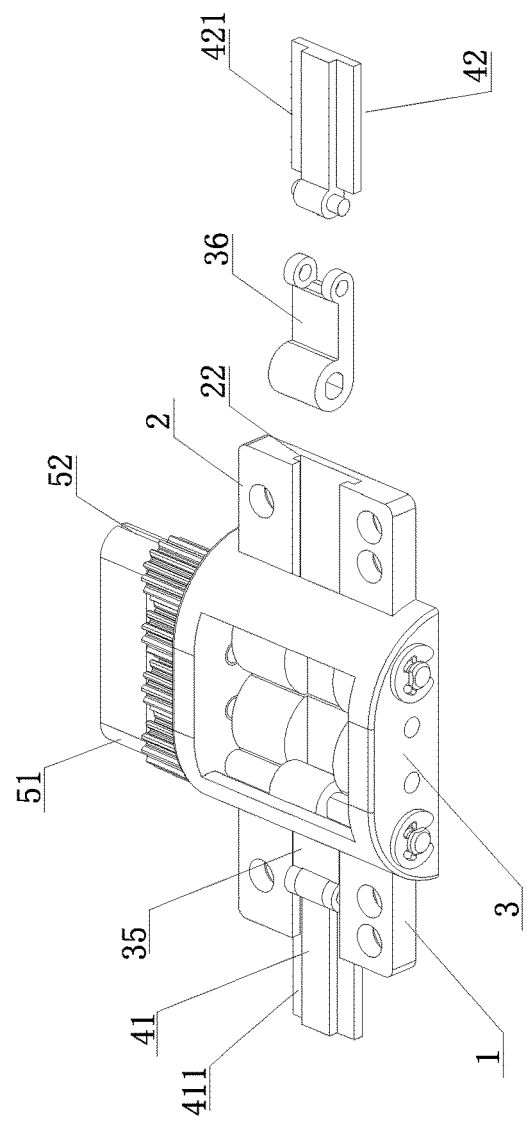

HINGE APPLIED TO INWARD-FOLDABLE FLEXIBLE SCREEN TERMINAL AND INWARD-FOLDABLE FLEXIBLE SCREEN TERMINAL

FIELD OF THE INVENTION

The present invention relates to an inward-foldable flexible screen terminal and a hinge thereof. The terminal can be a mobile electronic product such as a mobile phone.

BACKGROUND OF THE INVENTION

In the current flexible screen mobile terminal, hinges are very important for a mechanical structure. Nowadays, in order to meet the continuous and bendable screens such as flexible screens, some hinges have been produced to meet the characteristics of the flexible screen when it is folded, but the structure is relatively complex, for example, the left casing and the right casing are connected by a synchronous reverse connection structure in order to achieve synchronous reverse rotation. In order to realize the virtual circle center structure, the synchronous reverse connection structure is complicated and the middle support needs more space.

SUMMARY OF THE INVENTION

A hinge applied to an inward-foldable flexible screen terminal comprises a middle support, a left rotary connecting part and a right rotary connecting part, wherein the left rotary connecting part and the right rotary connecting part are rotatably mounted on the middle support, and the rotary axes of the left rotary connecting part and the right rotary connecting part are positioned on the left side and the right side of the middle support in the horizontal direction; the left rotary connecting part and the right rotary connecting part are respectively provided with a fixed connecting part; the middle support is also provided with a synchronous opposite rotary connecting mechanism; a rotating shaft of the synchronous opposite rotary connecting mechanism is positioned below the rotary axes of the left rotary connecting part and the right rotary connecting part in the vertical direction; movable connecting structures which can move relative to the left rotary connecting part and the right rotary connecting part are respectively arranged on two sides of the synchronous opposite rotary connecting mechanism; the fixed connecting part and the movable connecting structure on the left side are used for being connected with a left housing of the flexible screen terminal or a structure which is fixed with the left housing; the fixed connecting part and the movable connecting structure on the right side are used for being connected with a right housing of the flexible screen terminal or a structure which is fixed with the right housing, such that the left housing or the structure which is fixed with the left housing and the right housing or the structure which is fixed with the right housing respectively rotate by taking the rotary axes of the left rotary connecting part and the right rotary connecting part as axes and synchronously rotate in opposite directions.

Further, the rotation axes of the left rotary connecting part and the right rotary connecting part are higher than a hinge supporting surface of the hinge in a vertical direction when the hinge is unfolded.

Further, the rotary connecting structure between the left rotary connecting part and the middle support and the rotary connecting structure between the right rotary connecting part and the middle support adopt a structure that an arc sliding rail is matched with a sliding block, and are designed into a virtual circle center structure, such that the rotary axes of the left rotary connecting part and the right rotary connecting part are higher than the hinge supporting surface in the vertical direction.

Further, the left rotary connecting part and the right rotary connecting part are plate-shaped, and the plate surfaces of the left rotary connecting part and the right rotary connecting part form the hinge supporting surface.

Further, each movable connecting structure comprises a movable plate, wherein the movable plate is rotatably connected with one side of the synchronous opposite rotary connecting mechanism, and each movable plate is further provided with a sliding connecting structure which is in sliding connection with the left rotary connecting part or the right rotary connecting part.

Further, the synchronous opposite rotary connecting mechanism adopts a gear connecting structure, gears on the two sides of the gear connecting structure are connected with gear arms respectively, and the movable plates are rotatably connected with the gear arms.

Further, the synchronous opposite rotary connecting mechanism adopts the gear connecting structure, and the number of the gears which are sequentially connected is 2 or 4.

The present invention further aims to provide an inward-foldable flexible screen terminal applying above hinge. Therefore, the present invention adopts the following technical solution:

An inward-foldable flexible screen terminal comprises a left housing and a right housing, and is characterized in that the inward-foldable flexible screen terminal is also provided with the above hinge; the fixed connecting part and the movable connection structure on the left side are respectively connected with the left housing or the structure fixed with the left housing; and the fixed connecting part and the movable connection structure on the right side are respectively connected with the right housing or the structure fixed with the right housing.

Further, a pair of hinges is arranged along the axial direction of the hinge, and is coaxially arranged, and the middle support of the hinges is fixedly connected by the connecting structure.

Due to the adoption of the technical solution of the present invention, the present invention has a simple structure, does not need to adopt an avoiding turning plate, can adapt to the characteristic that a bending part of a flexible screen has a certain radius when the flexible screen is bent, can provide rotation of the virtual circle center neutral layer, simultaneously reduces the space occupation of the synchronous opposite connecting mechanism, is favorable for reducing the volume of the hinges, and reduces the size of a middle decorative housing.

BRIEF DESCRIPTION OF THE DRAWINGS

FIG. 1 is an exploded view of an embodiment of a hinge combination provided by the present invention.

FIG. 2 is a schematic view of an embodiment of a hinge combination provided by the present invention when unfolded.

FIG. 5 is a cross-sectional view of an embodiment of a flexible screen mobile terminal provided by the present invention when unfolded.

FIG. 6 is a cross-sectional view of an embodiment of a flexible screen mobile terminal provided by the present invention when folded.

FIG. 7 is a cross-sectional view of an embodiment of a hinge of the present invention when unfolded.

FIG. 8 is a schematic view of an embodiment of a hinge of the present invention viewed from the rear when unfolded.

FIG. 9 is a cross-sectional view of an embodiment of a hinge of the present invention when folded.

FIG. 10 is a schematic view of an embodiment of a hinge of the present invention when folded.

DETAILED DESCRIPTION

Figure 4:
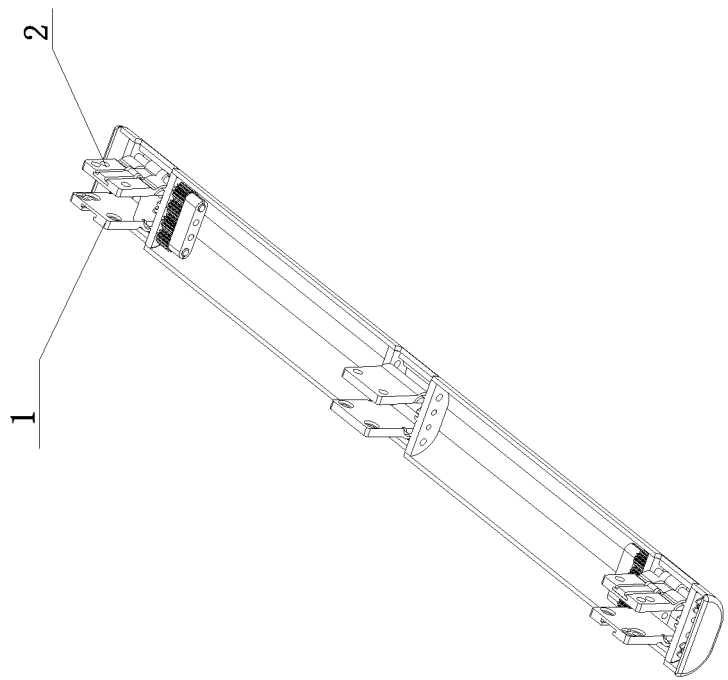
FIG. 4 is a schematic view of an embodiment of a hinge combination provided by the present invention when folded.
Figure 3:
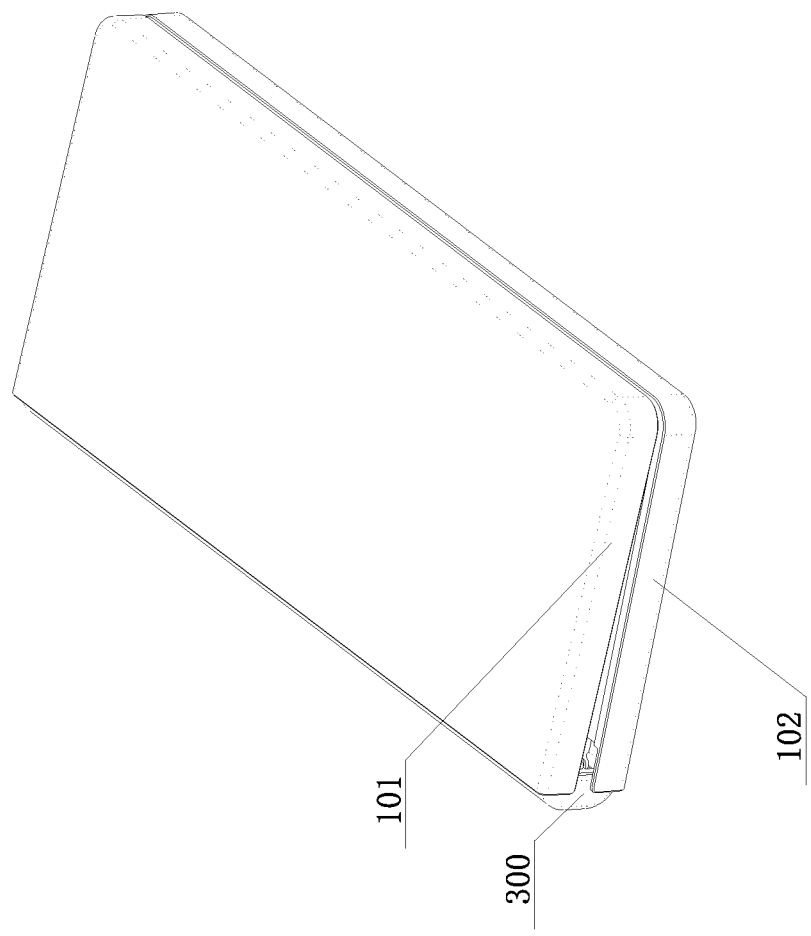
FIG. 3 is a schematic view of an embodiment of a flexible screen mobile terminal provided by the present invention when folded.

Referring to the accompanying figures, an inward-foldable flexible screen terminal of the present invention comprises a left housing 101 and a right housing 102.

A hinge provided by the present invention comprises a middle support 3, a left rotary connecting part 1 and a right rotary connecting part 2. The left rotary connecting part 1 and the right rotary connecting part 2 are rotatably mounted on the middle support 3, the rotary axes A and B of the left rotary connecting part and the right rotary connecting part are respectively located on the left side and the right side of the middle support 3 in the horizontal direction, a rotary connecting structure 6 can be of a structure that an arc sliding rail and a sliding block are matched, and therefore a virtual circle center structure can be designed, the rotary axes A and B of the left rotary connecting part 1 and the right rotary connecting part 2 are higher than a hinge supporting surface 30 in the vertical direction, and stress borne by a flexible screen 200 arranged on the inner side of the flexible screen terminal is minimum when the flexible screen 200 is bent and unfolded.

Preferably, the left rotary connecting part 1 and the right rotary connecting part 2 are plate-shaped, and the plate surfaces of the left rotary connecting part and the right rotary connecting part form the hinge supporting surface 30. The supporting surface 30 and supporting surfaces such as supporting surfaces on the left housing 101 and the right housing 102 can form a supporting plate of the flexible screen together when the inward-foldable flexible screen terminal is unfolded and unfolded.

The left rotary connecting part 1 and the right rotary connecting part 2 are respectively provided with a fixed connecting part, and can be screw connecting positions 11 and 21.

The middle support 3 is also provided with a synchronous opposite rotary connecting mechanism, and rotating shafts 310 and 340 of the synchronous opposite rotary connecting mechanism are positioned below the rotary axes A and B of the left rotary connecting part 1 and the right rotary connecting part 2 in the vertical direction. The synchronous opposite rotary connecting mechanism can adopt a gear connecting structure, a cam and other structures.

In this embodiment, the synchronous opposite rotary connecting mechanism adopts a gear connecting mechanism, and is provided with gears 31, 32, 33 and 34 which are connected in sequence, and the gears 31 and 34 are located on the two sides. Rotating shafts 310 and 340 of the gears 31 and 34 are connected with gear arms 35 and 36 respectively, and the gear arms 35 and 36 rotate synchronously with the gears 31 and 34 respectively.

Movable connecting structures capable of moving relative to the left rotary connecting part 1 and the right rotary connecting part 2 are arranged on the two sides of the synchronous opposite rotary connecting mechanism. In this embodiment, in order to reduce the moving space and the size of a middle decorative casing 300 of a mobile terminal, the movable connecting structures are movable plates and are in sliding connection. The movable plates on the left side and the right side are marked as 41 and 42 respectively, and the movable plates 41 and 42 are in rotating connection with the gear arms 35 and 36. The movable plates 41 and 42 are in sliding connection with the left rotary connecting part 1 and the right rotary connecting part 2 through the sliding connecting structures respectively, the sliding connecting structures can be straight edges or sliding blocks 411 and 421 with certain lengths or can be provided with other sliding structures or the like, and the left rotary connecting part 1 and the right rotary connecting part 2 are provided with corresponding guide rails 12 and 22.

The screw connecting position 11 on the left side is fixedly connected with the left housing 101, the screw connecting position 21 on the right side is fixedly connected with the right housing 102, the movable plate 41 on the left side is connected with the left housing 101 in a sliding mode, and the movable plate 42 on the right side is movably connected with the right housing 102.

As an alternative, the sliding connecting structure can also adopt a matching structure of a curved groove and a pin, but in the occasion of the present invention, a certain space can be occupied to influence the appearance of the decorative casing 300.

A torsion mechanism can also be arranged in the hinge to provide a rotating hand feeling or further provide a function of stopping rotating at any time and positioning a rotating angle at any time. The torsion mechanism can adopt two reed pipes 51 and 52 which are connected together, and the reed pipes 51 and 52 are respectively sleeved outside the rotating shafts 310 and 340 and are clamped.

When the hinge is applied to the inward-foldable flexible screen terminal, the inward-foldable flexible screen terminal is provided with a pair of hinges along the axial direction of the hinge of the inward-foldable flexible screen terminal, the pair of hinges are coaxially arranged, and the middle support 3 of the pair of hinges is fixedly connected by the connecting structure which can be the decorative casing 300 or other connecting brackets.

The above description describes the specific embodiments of the present invention only, but the structural features of the present invention are not limited thereto. It is foreseeable that the motion mechanism of the present invention can be applied to various flexible screen mobile terminals. Any and all changes or modifications made by those skilled in the art within the art shall fall within the scope of protection of the present invention.

The invention claimed is:

1. A hinge applied to an inward-foldable flexible screen terminal, comprising a middle support, a left rotary connecting part and a right rotary connecting part, wherein
the left rotary connecting part and the right rotary connecting part are rotatably mounted on the middle support, and rotary axes of the left rotary connecting part and the right rotary connecting part are positioned on the left side and the right side of the middle support in a horizontal direction;
the left rotary connecting part and the right rotary connecting part each have a hinge supporting surface for supporting the flexible screen terminal and are respectively provided with a fixed connecting part for fixing the flexible screen terminal to the hinge supporting surface of the left rotary connecting part and the right rotary connecting part;

the middle support is provided with a synchronous opposite rotary connecting mechanism, a rotating shaft of the synchronous opposite rotary connecting mechanism is positioned below the rotary axes of the left rotary connecting part and the right rotary connecting part in a vertical direction;

movable connecting structures which can slidably move relative to the left rotary connecting part and the right rotary connecting part in a direction parallel with the hinge supporting surface of the left rotary connecting part and the right rotary connecting part are respectively arranged on two sides of the synchronous opposite rotary connecting mechanism;

the fixed connecting part and the movable connecting structure on the left side are used for being connected with a left housing of the flexible screen terminal or a structure which is fixed with the left housing, the fixed connecting part and the movable connecting structure on the right side are used for being connected with a right housing of the flexible screen terminal or a structure which is fixed with the right housing, such that the left housing or the structure which is fixed with the left housing and the right housing or the structure which is fixed with the right housing respectively rotate by taking the rotary axes of the left rotary connecting part and the right rotary connecting part as axes and synchronously rotate in opposite directions.

2. The hinge applied to an inward-foldable flexible screen terminal according to claim 1, wherein the rotation axes of the left rotary connecting part and the right rotary connecting part are higher than the hinge supporting surface of the left rotary connecting part and the right rotary connecting part in a vertical direction when the hinge is unfolded.

3. The hinge applied to an inward-foldable flexible screen terminal according to claim 1, wherein the rotary connecting structure between the left rotary connecting part and the middle support and the rotary connecting structure between the right rotary connecting part and the middle support adopt a structure that an arc sliding rail is matched with a sliding block, and are designed into a virtual circle center structure, such that the rotary axes of the left rotary connecting part and the right rotary connecting part are higher than the hinge supporting surface in the vertical direction.

4. The hinge applied to an inward-foldable flexible screen terminal according to claim 1, wherein the left rotary connecting part and the right rotary connecting part are plate-shaped, and the plate surfaces of the left rotary connecting part and the right rotary connecting part form the hinge supporting surface.

5. The hinge applied to an inward-foldable flexible screen terminal according to claim 1, wherein each movable connecting structure comprises a movable plate, wherein the movable plate is rotatably connected with one side of the synchronous opposite rotary connecting mechanism, and each movable plate is further provided with a sliding connecting structure which is in sliding connection with the left rotary connecting part or the right rotary connecting part.

6. The hinge applied to an inward-foldable flexible screen terminal according to claim 1, wherein the synchronous opposite rotary connecting mechanism adopts a gear connecting structure, gears on the two sides of the gear connecting structure are connected with gear arms respectively, and the movable plates are pivotally hinged with the gear arms.

7. The hinge applied to an inward-foldable flexible screen terminal according to claim 1, wherein the synchronous opposite rotary connecting mechanism adopts the gear connecting structure, and the number of the gears which are sequentially connected is 2 or 4.

8. An inward-foldable flexible screen terminal, comprising a left housing and a right housing, wherein the inward-foldable flexible screen terminal is also provided with the hinge of claim 1, the fixed connecting part and the movable connection structure on the left side are respectively connected with the left housing or the structure fixed with the left housing, and the fixed connecting part and the movable connection structure on the right side are respectively connected with the right housing or the structure fixed with the right housing.

9. The inward-foldable flexible screen terminal of claim 8, wherein a pair of the hinges is arranged along the axial direction of the hinge, and is coaxially arranged, and the middle support of the hinges is fixedly connected by the connecting structure.

* * * * *